(12) United States Patent
Mualla (10) Patent No.: US 9,260,860 B2
(45) Date of Patent: Feb. 16, 2016

(54) PASSIVE DAMPER

(75) Inventor: Imad H Mualla, Copenhagen (DK)

(73) Assignee: Damptech A/S, Lyngby (DK)

( * ) Notice: Subject to any disclaimer, the term of this patent is extended or adjusted under 35 U.S.C. 154(b) by 0 days.

(21) Appl. No.: 14/232,533

(22) PCT Filed: Jul. 12, 2012

(86) PCT No.: PCT/EP2012/063714
§ 371 (c)(1),
(2), (4) Date: Feb. 24, 2014

(87) PCT Pub. No.: WO2013/010917
PCT Pub. Date: Jan. 24, 2013

(65) Prior Publication Data
US 2014/0174002 A1  Jun. 26, 2014

(30) Foreign Application Priority Data
Jul. 15, 2011  (DK) .................. 2011 00546

(51) Int. Cl.
*E04H 9/02* (2006.01)
*E04B 1/98* (2006.01)
*F16F 1/40* (2006.01)

(52) U.S. Cl.
CPC . *E04B 1/985* (2013.01); *E04B 1/98* (2013.01); *E04H 9/021* (2013.01); *E04H 9/022* (2013.01); *F16F 1/40* (2013.01)

(58) Field of Classification Search
CPC ........... E04H 9/028; E04H 9/02; E04H 9/022; E04H 9/021; E04H 9/027; E04B 1/98; E04B 1/985; F16F 1/40

USPC ........... 52/167.1, 167.3, 167.5, 167.6, 167.7, 52/167.8; 248/562, 567, 569
See application file for complete search history.

(56) References Cited

U.S. PATENT DOCUMENTS

| | | | | |
|---|---|---|---|---|
| 5,375,382 A * | 12/1994 | Weidlinger | ................ | 52/167.3 |
| 6,840,016 B1 * | 1/2005 | Mualla | ................ | 52/167.1 |
| 7,647,734 B2 * | 1/2010 | Sarkisian | ................ | 52/167.3 |
| 8,807,307 B2 * | 8/2014 | Choi | ................ | 188/381 |
| 2005/0115170 A1 * | 6/2005 | Mualla | ................ | 52/167.1 |
| 2005/0284041 A1 * | 12/2005 | Chen | ................ | 52/167.5 |
| 2008/0307722 A1 * | 12/2008 | Christopoulos et al. | ................ | 52/167.1 |
| 2010/0043317 A1 * | 2/2010 | Mualla | ................ | 52/167.1 |

(Continued)

FOREIGN PATENT DOCUMENTS

JP  2011080486 A * 4/2011
WO  WO 2011038742 A1 * 4/2011

*Primary Examiner* — Robert Canfield
*Assistant Examiner* — Babajide Demuren
(74) *Attorney, Agent, or Firm* — Ziegler IP Law Group, LLC (57) ABSTRACT

A passive damper with a first set of parallel disposed plates and a second set of parallel disposed plates, that overlap one another in an alternating fashion at a rotational joint with damping pads between the plates. The rotational joint comprises a pin or bolt inserted through apertures in the plates and there is a connection hole in each of the plates of the second set of plates for receiving a connection pin (6) therein for connecting the second set of plates to a members of a structure. The connection holes in a selection of the plates of the second set of plates is shaped and dimensioned to provide a predetermined amount of clearance with said connection pin so that the connection pin can move inside the connection holes of the selection of plates taking part in the damping action of the damper.

14 Claims, 6 Drawing Sheets

(56) References Cited

U.S. PATENT DOCUMENTS

2012/0260585 A1* 10/2012 Mualla .................. 52/167.1
2013/0174495 A1* 7/2013 Krishnan et al. ............ 52/1
2013/0283709 A1* 10/2013 Christopoulos et al. ..... 52/167.1

* cited by examiner

PASSIVE DAMPER

The present invention relates to a damper that can be used to protect a structure or a structural system, e.g. a building against dynamic stress such as the stress caused by an earthquake, the shock of a large sea wave, or a stress that is produced by vibration and the like caused by shocks from transportation, machines, wind, or the like. More specifically, the invention relates to a damper that can operate with different damping forces for different displacement magnitudes.

BACKGROUND OF THE INVENTION

When a structure or structural system is excited, elements of the structure may get displaced relative to one another. If such displacements are large, or if they occur periodically, they may have serious impact on the conditions of the structure, and may cause severe damages or even result in a collapse.

Dampers play an important role in the protection of structures such as buildings, and they exist in numerous variants. Dampers are typically damping the motion by means of a friction force between two parts attached to the frame structure of the building, or by means of a fluid being pressed to flow between two chambers through a restriction. Other similar well-known methods of damping motion or vibrations exist. Some dampers are actively changing the damping effect corresponding to external conditions, and other dampers are passive dampers having a constant damping characteristic. The active dampers are expensive and technically complicated devices, which need extensive maintenance in order to work when needed. Further, they are prone to malfunctions, e.g. leaking of hydraulic fluids or breakdown of electronic control systems.

WO 2011038742 discloses a passive damper that is constructed with overlapping sets of plates connected by a bolt with damping pads arranged between the plates and the bolts applying a compression force on the plates and the damping pads therebetween. The damper impedance can be adjusted by changing the compression force. However, this can only be done during installation or during service, and not in response to an event such as a seismic event.

Passive dampers with a variable damping characteristics are sometimes desirable but no commercially viable dampers of such kind are presently available.

DISCLOSURE OF THE INVENTION

On this background, it is an object of the present application to provide a passive damper for dampening relative movement between members of a structure to which the damper can be connected that has a damper characteristic or impedance that changes with the amplitude of the oscillations or with magnitude of the movement that it is exposed to.

This object is achieved by providing a passive damper for dampening relative movement between members of a structure to which the damper can be connected, the damper includes at least a first set of parallel disposed plates, and a second set of parallel disposed plates, the first set of plates and the second set of plates overlap one another in an alternating fashion at a rotational joint with damping pads between the plates, the rotational joint comprises a pin or bolt inserted through apertures in the plates, a connection hole in each of the plates of the second set of plates for receiving a connection pin therein for connecting the second set of plates to one of the members, the connection holes in a selection of the plates of the second set of plates are shaped and dimensioned to provide a predetermined amount of clearance with the connection pin so that the connection pin can move inside the connection holes of the selection of the plates to a predetermined extent without the selection of plates taking part in the damping action of the damper.

By providing a predetermined amount of clearance between the apertures of selected plates and the connection pin it is possible to construct a damper in which only a few of the plates become active in the damping process when the oscillations or movements have a relatively small magnitude, whilst more of the plates come into action when the magnitude of the oscillations or movements increases and becomes of a relatively larger magnitude. Thus, it becomes possible to have a damper that provides for relatively little damping forces at small magnitudes of oscillations or movements and that provides a progressively increased damping force (impedance) when the oscillations or movements become a larger and are of a substantial magnitude. This means that the damper impedance has a value that changes stepwise in relation to the size or magnitude of the movement of the damper.

Preferably, the shape and size of the connection holes in the plates outside the selection being dimensioned relative to the shape and size of the cross-section of the connection pin such that the plates in the second set of plates outside the selection have substantially no clearance between their respective connection hole and the connection pin.

The shape and size of the connection holes in the plates of the selection may be dimensioned relative to the shape and size of the cross-section of the connection pin such that plates in the selection of plates of plates have a first amount of substantial amount of clearance between their respective connection holes and the connection pin.

In an embodiment the plates outside the section selection of plates move with the one member at any amplitude of movement of the one member and wherein the plates in the selection move with the one member only if the extent of the movement of the one member exceeds the clearance between the connection hole concerned and the connection pin.

Preferably, the connection holes of the selection of plates have an elongated outline or shape.

In an embodiment the damper includes a further selection of plates within the selection of plates the shape and size of the connection holes of the further selection of plates relative to the shape and size of the cross section of the connection pin being such that the extent of clearance between the connection holes concerned and the connection pin is larger than the first substantial amount of clearance.

In another embodiment the plurality of damper pads comprises first selection of pads with a first effective contact area size and a second selection of pads with a second effective contact area size different from the first contact area size.

In yet another embodiment the damper pads are disk shaped with a central hole and the effective contact area is differentiated in a selection of damping pads through the section of the outer diameter and/or the inner diameter of the damping pads concerned.

The object above is also achieved by providing a passive damper for dampening relative movement between members of a structure to which the damper can be connected, the damper including a first set of parallel disposed plates, and a second set of parallel disposed plates, the first set of plates and the second set of plates overlap one another in an alternating fashion at a rotational joint with damping pads between the plates the rotational joint comprises a pin or bolt inserted through apertures in the plates, whereby apertures in a selection of the plates are shaped and dimensioned to provide a predetermined amount of clearance with the pin or bolt so that the pin or bolt can move inside the aperture to a predetermined extent without the selection of plates taking part in the damping action.

Further objects, features, advantages and properties of the damper according to the present disclosure will become apparent from the detailed description.

BRIEF DESCRIPTION OF THE DRAWINGS

In the following detailed portion of the present description, the invention will be explained in more detail with reference to the exemplary embodiments shown in the drawings, in which:

FIG. 10a, in a side view, shows another embodiment of a damper according to the invention, FIG. 10b, in a top view, shows the damper according to FIG. 10a, FIG. 10c shows how each of the damper's second elongate plates may be differently configured from each other, FIG. 10d shows one configuration of a first plate in the damper according to FIGS. 10 and 10b, FIG. 10e shows another configuration of a first plate in the damper according to FIGS. 10 and 10b, and FIG. 10f shows yet another configuration of a first plate in the damper according to FIGS. 10 and 10b.

DETAILED DESCRIPTION OF PREFERRED EMBODIMENTS

Below follows a description of embodiments of the present invention, referring to the figures. In the below description, a member of a structure, such as a building, is understood to include e.g. pillars, beams, stiffeners, stretchers, v-braces and the like, and any member which maintains the rigidity of a structure of a construction or structural body of e.g. a building or the like.

With reference to FIGS. 1a to 1d a damper 1 according to an exemplary embodiment is shown connected to members 2, 3 of a structure, such as a building. The damper 1, in this embodiment is substantially T-shaped. Each end of the T-shaped damper is connected to the structure. The two opposite ends to the "top" or horizontal line of the T are connected via respective pins 6 and brackets 5 to member 3 of the structure. The free end of the "leg" or vertical line of the T is connected via a pin 6 and a bracket 4 to member 2 of the structure.

With reference to FIGS. 2a-2d, 3a-3d and 4a-4d the damper 1 according to an exemplary embodiment is illustrated in greater detail.

Figure 1A:
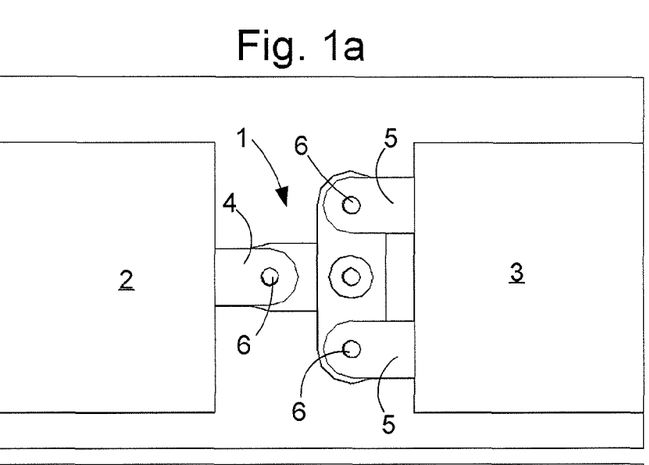
FIGS. 1a-1d are a various views of an exemplary embodiment of a damper connected to two members of a structure.
Figure 1B:
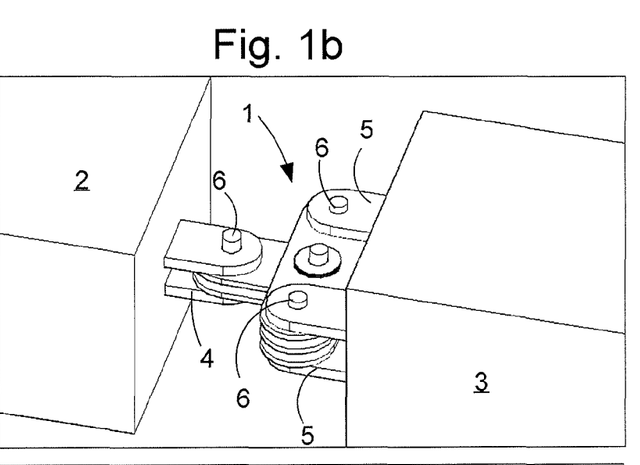
Figure 1C:
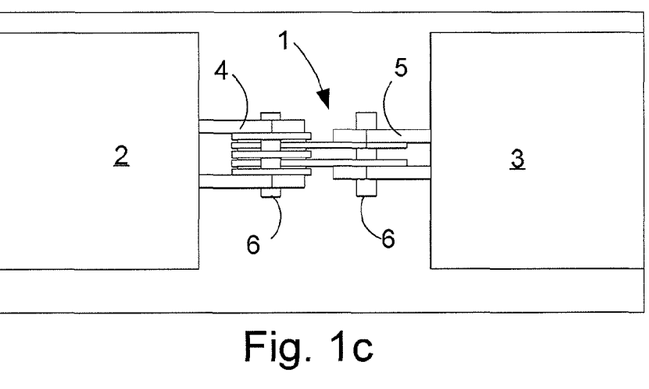
Figure 1D:
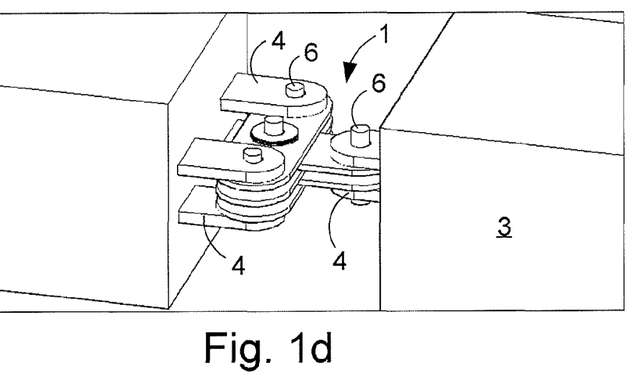
Figure 2A:
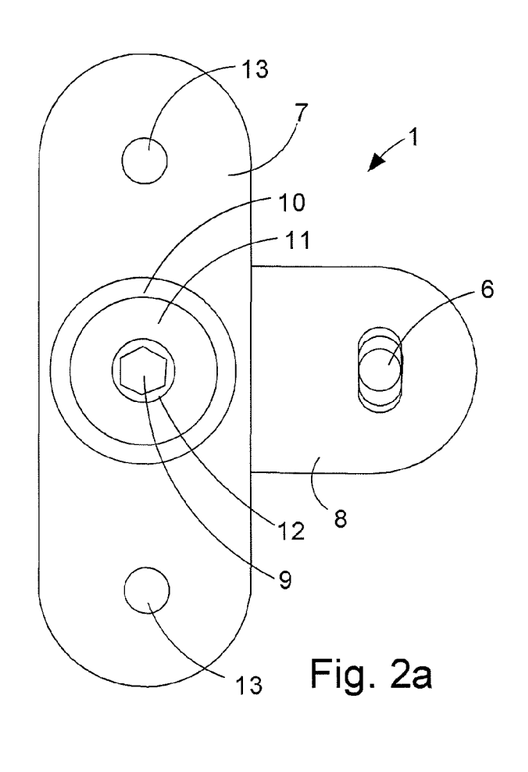
FIG. 2a is a side view of an exemplary embodiment of a damper.

The passive damper 1 includes a first set of plates 7 forming the "top" of the T. The first set of plates 7 includes a plurality of elongate plates 7a that are substantially identical in shape and size. In the shown embodiment the set of plates 7 includes six plates 7a that are disposed in parallel, i.e. extending in the same direction and at the same distance apart at every point. In other embodiments the first set of plates 7 can include as few as three plates 7a or many more than six plates 7a arranged in parallel. The plates 7a have a rectangular cross-section and an outline like a stadium, i.e. the end section or at least the corners are preferably rounded.

The passive damper 1 includes a second set of plates 8 forming the "leg" or the vertical or upright line of the T. The second set of plates 8 includes a plurality of elongate plates 8b,8c,8d that are substantially identical in shape and size. In the shown embodiment the set of plates 8 includes five plates 8b,8c,8d that are disposed in parallel, i.e. extending in the same direction and at the same distance apart at every point. In other embodiments the second set of plates 8 can include as few as two plates 8a or many more than five plates 8a arranged in parallel. The plates 8a have a rectangular cross-section and an outline like a stadium, i.e. as describe for the first set of plates 7 above.

The first set 7 of plates and said second set 8 of plates overlap one another in an alternating fashion at a rotational joint that is placed substantially in the middle of the longitudinal extent of the plates 7a of the first set of plates 7 and at one (non-free) longitudinal extremity of the plates 8b,8c,8d of the second set of plates 8. The rotational joint allows the plates 7a, 8b,8c,8d to rotate with respect to each other.

Damping pads 15a are arranged between the plates 7a,8b, 8c,8d at the rotational joint.

The plates of the first 7 set and of the second set 8 are arranged such that a plate 7a,8b,8c,8d of one of the sets 7,8 is inserted between two plates 7a,8b,8c,8d of the other set 7,8 with damping pads 15a sandwiched between neighboring plates 7a,8b,8c,8d, except for two outer plates 7a that belong to the first set of plates 7.

The damping disks or pads 15a may be made from a friction material or from a visco-elastic material. The damping disks 15a are provided for damping movements between the first set 7 of elongate plates 7a, in relation to the second set 8 of elongate plates 8b,8c,8d. When friction material is used for the damping disk 15a, relative rotational movement between plates 7a,8b,8c,8d, is dampened/attenuated by fiction and the forces related thereto.

Preferably, compound materials are used for the friction material, selected from materials such as brass and aluminum, or, alloys thereof, or compound fiber materials such as plastic and glass, carbon and the like, or, optionally compound fiber materials such as ceramic materials and glass, carbon, and the like.

Suitable visco-elastic materials for the damping disks 15a, are for example, rubber, acryl polymers, copolymers, optionally glass-like materials and the like and combinations thereof, which disperses energy when exposed to shear deformation.

The damping pad or disk 15a may be a of disc shape and with an opening, hole or aperture, to correspond to the respective holes or apertures in the first elongate plates 7a and in the second elongate members 8b,8c,8d, respectively.

The rotational joint includes a pin or bolt 9 inserted through apertures 15 in each of the plates 7a,8b,8c,8d of both sets of plates 7,8 and the pin or bolt 9 joins the plates 7a,8b,8c,8d together, with a nut 9a affixed to the threaded free end of the bolt 9. The apertures or holes in the plates 7a and 8a,8b,8c have a circular outline. The diameter of the apertures or holes is slightly larger than the diameter of the pin or bolt 9 so that the plates 8b,8c,8d can rotate about the pin or bolt without any excess backlash or play.

A clamping member, e.g. in the form of a disc spring 11 and washers 12, may further be attached via the bolt 9 and nut 9a. There are washers 10 provided on the outwardly facing surface of the elongate plates 7a that is located in outer layer of the first set 7 of plates 7a. There are clamping means in the form of disc springs 11 arranged on the outer surface of each of these washers 10. The clamping means/disc springs 11 functions as an energy buffer for the compression or clamping force, pressing the plates 7a and the plates 8b,8c,8d together and towards the damping pads or disks 15a. There may be provided holes or apertures in the damping discs 15a for receiving the pin or bolt 9 therein. There may be washers 12 arranged on the opposite side of the disc springs with respect to the washers 10. The bolt 19 is passed through the washers 12, the holes in the disk springs 11, the holes in the plates 7a,8b,8c,8d and the nuts 9a is affixed to the extremity of the bolt 9 where the bolt protrudes from the holes. To prevent loosening, a double nut (not shown) may be used.

The compression or clamping force that presses the plates 7a and the plates 8b,8c,8d onto the damping disks 15a can be adjusted using the amount of tightening on the nut 9a, the spring constant of the disc springs 11, or the number of layers of disc springs 11.

A rotational joint is provided near the two opposite longitudinal extremities of the plates 7a of the first set 7. This joint may be in the form of a circular hole or aperture 13 in each of the plates 7a of the first set 7. The hole or apertures 13 are adapted for connection to a member 3 of the structure via a bracket 5, by a connection pin 6 as shown in FIGS. 1a to 1d with the holes or apertures having a diameter slightly larger than the diameter of the hinge connection pin 6 to allow rotation of the plates 7a relative to the connection pin 6 with a minimal amount of play or backlash.

Figure 2B:
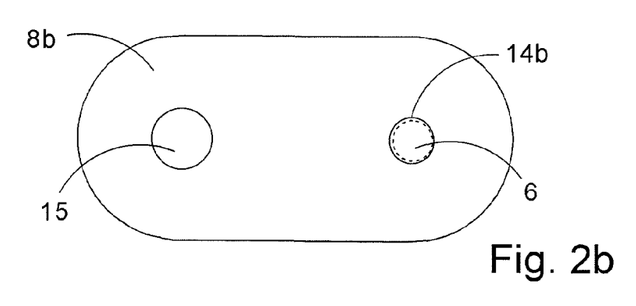
FIGS. 2b-2d show different plates used in the damper shown in FIG. 2a, FIGS. 3a-3d is a series of side views of the damper shown in FIG. 2a with an increasing extent of movement.
Figures 2C, 2D:
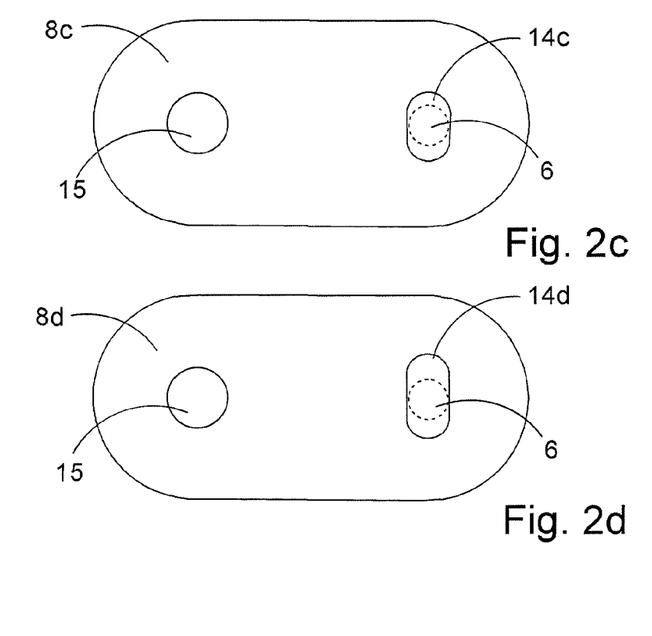

A rotational joint is also provided near the longitudinal extremities of the plates 8b,8c,8d of the second set 8. This joint may be in the form of a circular connection hole or aperture 14b in the plates 8b with a diameter relative to the diameter of the connection pin 6 that provides for a small amount of clearance or backlash that allows the plates to rotate relative to the connection pin 6. The joint can also be in the form of an enlarged circular hole (not shown) and/or in the form of an elongate connection hole 14c,14d with a stadium like outline in the plates 8c,8d. Various shapes for the outline of the connection hole 14c,14d can be used as long as the shape and size of the connection hole 14c,14d relative to the shape and size of the (cross-section of the) connection pin 6 provides for the desired amount of clearance in the desired direction or directions. For a connection pin 6 with a circular cross-section connection holes with a circular, oval elliptic, stadium like or other rounded outline is suitable. For some applications only a particular direction for the clearance will be required whilst other applications may require clearance in another direction or in several directions.

In the shown exemplary embodiment the connection holes 14c,14d are provided with a predetermined amount of clearance relative to the diameter of the connection pin 6 for allowing a predetermined magnitude of movement in a given direction of the connection 6 relative to the plate 8c,8d concerned without the plate 8c,8d concerned moving with the connection pin 6. The amount of clearance of the holes 14c in the plates 8c is of a first substantial amount and the amount of clearance of the connection holes 14d in the plates 8d is of a second substantial amount of clearance that is larger than the first amount of clearance. The connection holes or apertures 14b,14c,14d are adapted for connection to a member 2 of the structure via a bracket 4, by a connection pin 6 as shown in FIGS. 1a to 1d.

A selection of said plates 8c,8d of said first set of plates 8c,8d has connection holes 14c,14d that are shaped and dimensioned to provide a predetermined amount of clearance with said connection pin 6 so that said connection pin 6 can move inside the connection holes 14c,14d of said selection of said plates 8c,8d to a predetermined extent without said selection of plates 8c,8d taking part in the damping action of the damper 1. This effect is illustrated in the series of FIGS. 3a to 3d and 4a to 4d. The upwardly pointing arrow illustrates movement of the connection pin 6. As shown in these FIGS. 3b and 4b, the plates 8b with the holes 14b with the minimum amount of clearance with respect to the connection pin 6 move with the connection pin 6 at the first movement of the connection pin. The plates 8c,8d in the selection do not move. The damping effect (impedance) of the damper is at this extent of movement of the connection pin 6 only determined by the plates 8b.

Figure 3A:
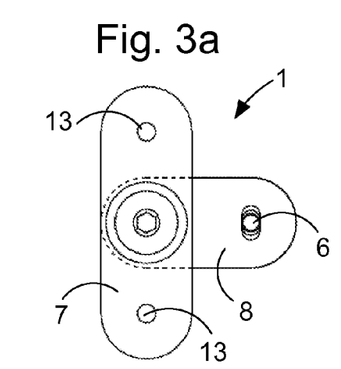
Figure 3B:
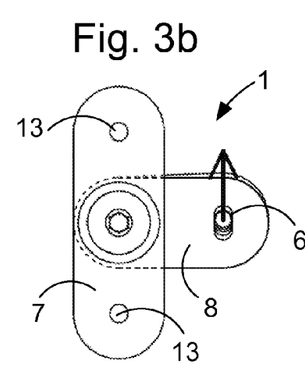
Figure 3C:
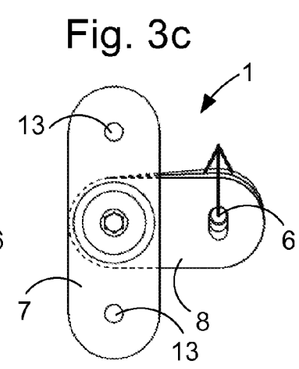
Figure 4A:
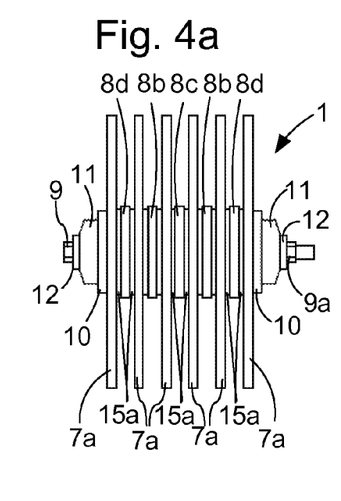
FIGS. 4a-4d is a series of rear views of the damper shown in FIG. 2a in an increasing extent of movement.
Figure 4B:
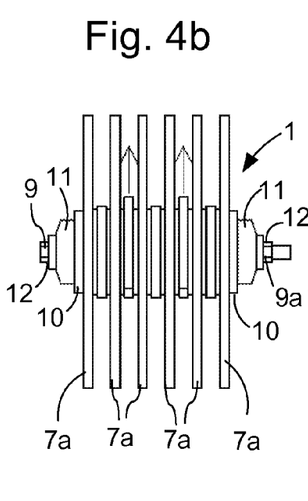
Figure 4C:
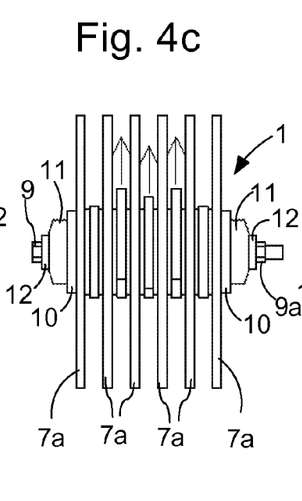

As shown in FIGS. 3c and 4c, the plates 8b with the holes 14b with the minimum amount of clearance with respect to the connection pin 6 and the plates 8c with the connection holes 14c with a first substantial amount of clearance with respect to the connection pin 6 all move when the extent of the movement of the connection pin 6 exceeds a predetermined level (the extent of the movement of the connection pin 6 in FIGS. 3c and 4c is larger than in FIGS. 3b and 4b). The plates 8d still do not move. The damping effect (impedance) of the damper 1 is at this extent of movement of the connection pin 6 determined by the plates 8b and 8c.

Figure 3D:
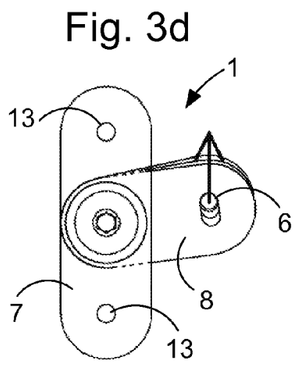
Figure 4D:
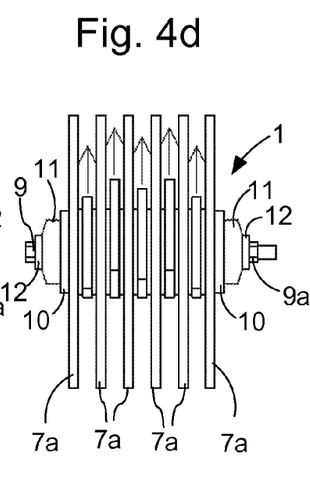

As shown in these FIGS. 3d and 4d, with even larger extent of movement of the connection pin 6 the plates 8b with the holes 14b with the minimum amount of clearance with respect to the connection pin 6 and the plates 8c with the connection holes 14c with a first substantial amount of clearance with respect to the connection pin 6 and the plates 8d with the connection holes 14d with a second substantial amount of clearance with respect to the connection pin 6 all move when the extent of the movement of the connection pin 6 exceeds a further predetermined level. The damping effect (impedance) of the damper 1 is at this extent of movement of the connection pin 6 determined by all the plates 8b,8c and 8d in the second set.

For the material of the plates 7a,8b,8c,8d, metals, like steel, resins, ceramics, carbon fibers, combinations thereof and the like may be used.

It is noted that the construction of the damper 1 and in particular the connection means to the member 2,3 of the structure can be reversed. In this reversed construction the plates 8 are provided with pins (not shown) and the structure 2,3 or a bracket 4,5 rigidly connected to the structure 2,3 is provided with apertures with a shape and size that provides the required amount of clearance with the respective pins of the plates.

Figure 5:
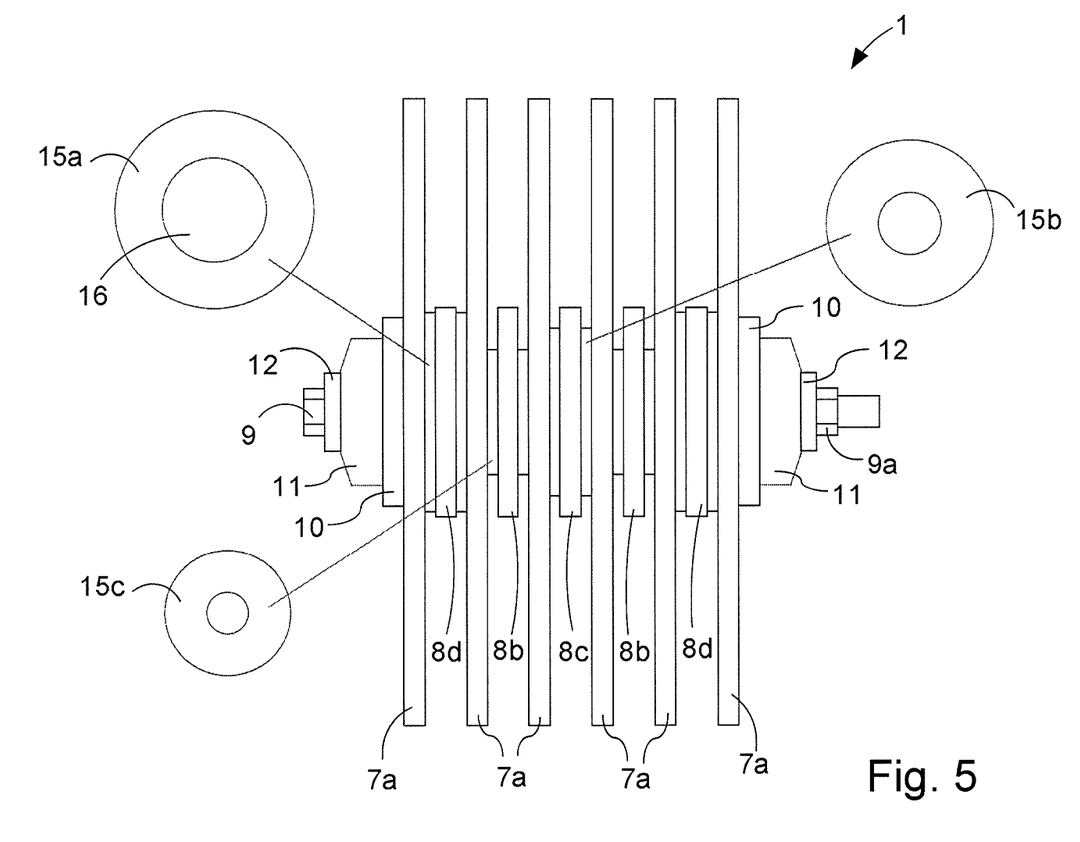
FIG. 5 is a rear view of the damper according to FIG. 2 illustrating exemplary damping pads used therein.

FIG. 5 shows another exemplary embodiment. This embodiment is essentially identical to the embodiment described here above, except for some modifications to the damping disks.

The dimensions of the individual damping pads or discs 25 in a set of friction pads or discs 25 that is associated with the rotational particular joint between the first set of plates 7 and the second set of plates 8 can be selected in order to obtain particular characteristics for the damper 1. Thus, there can be first damping discs with e.g. a larger inner diameter in a set of damping discs whilst the other second damping discs of the set damping discs have a smaller inner diameter. Therefore, the first damping discs have a smaller effective surface area compared to the second damping discs. The damping effect between plates 7a,8b,8c,8d with the first damping discs therebetween will be less than the damping effect between elongate plates 7a,8b,8c,8d with the second damping discs therebetween. Consequently, by having a set of damping discs or pads that includes individual damping discs or pads with different dimensions the characteristics of the damper can be adapted to the needs. In the exemplary embodiment shown in FIG. 5 three different types of damping discs 15a,15b,15c with varying dimensions and effective contact surface area have been used.

Figure 6:
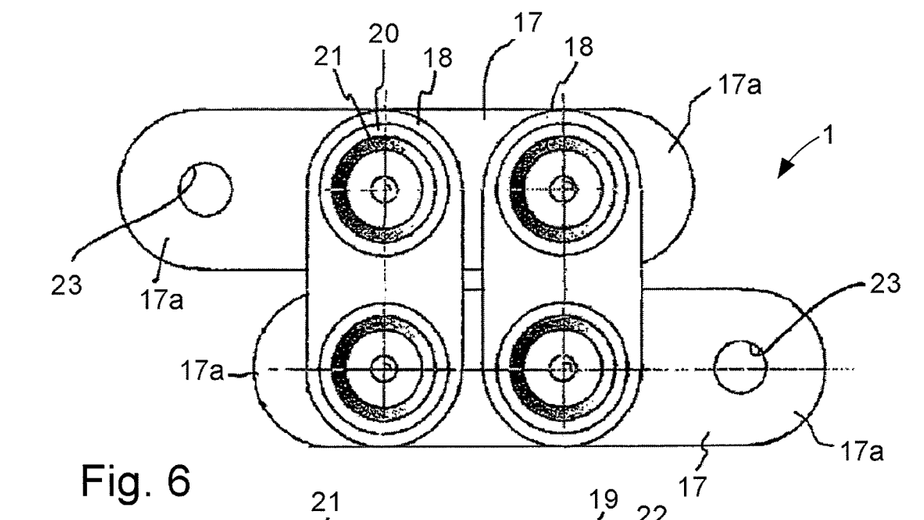
FIG. 6 is a side view of another embodiment of a damper.
Figure 7:
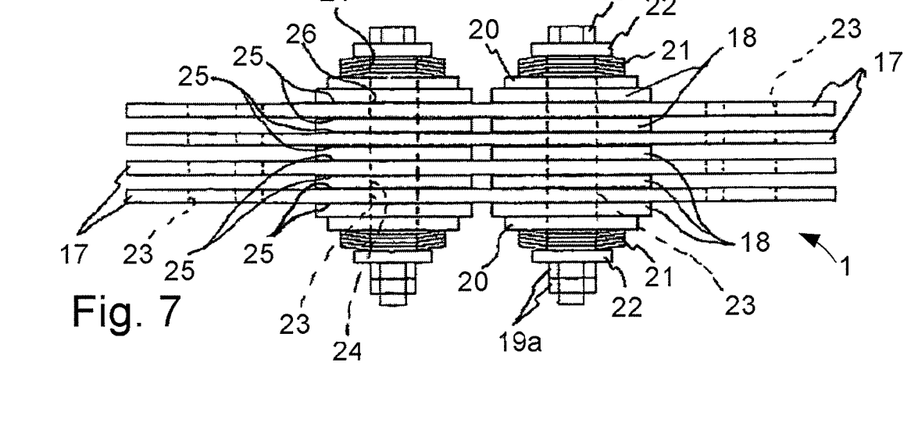
FIG. 7 is a top of the damper according to FIG. 6, and FIGS. 8 and 9 show different plates used in the damper shown in FIG. 6

FIG. 6 shows a side view of a damper 1 according to another exemplary embodiment for damping movements/oscillations in a construction for a system according to one embodiment of the present invention. FIG. 7 shows a top view of the same damper.

The damper 1 includes two sets of first elongate plates 17; two sets of second elongate plates 18; and damping pads or disks 25 sandwiched between the two sets of the first elongate plates 17 and the two sets of second elongate plates 18. The set of second elongate plates 18 are connected to the two sets of the first elongate plates 17, such that they may rotate with respect to each other, in rotational connections.

The first elongate plates 17 are formed from stadium shaped plates, i.e. the end sections or at least the corners of the plates are preferably rounded. A rotational joint 23 is provided near one extremity 17a of the plates 17. The joint 23, may as shown be in the form of a circular hole or aperture in each of the plates of the set is adapted for connection to a structural member, by a connection pin similar as described with reference to the embodiments described here above.

In the shown embodiment, the rotational connections are formed by holes or openings in the first elongate plates 17, and in the second elongate members 18, and each of the rotational connections are formed in series along the longitudinal axis of the first elongate plates 17. Further the rotational connections may be provided as shown by a bolt 19 which extends through the respective elongate plates 17, and joins them together, with a nut 19a affixed to the threaded free end of the bolt 19.

A clamping member in the form of e.g. a disc spring 21, and washers 22 may further be attached via the bolt 19 and nut 19a. The two sets of first elongate plates 17 are arranged in parallel. The joints 23 of the one set of first elongate plates 17 are arranged adjacent to the opposite end 17a of the other set of first elongate plates 17.

The two sets of second elongate plates 18 are arranged so as to be parallel to one another. These two sets of second elongate plates 18 are also plate members with an outline like a stadium, with holes or apertures 14, that form part of the rotational connections, together with the holes or apertures 23 in the first elongate plates 17.

For the first and second elongate plates 17,18, the same materials metals, can be used as for the plates of the embodiment described above.

A damping disk or pad 25 is provided between each first elongate plate 17 and second elongate plate 18. Thus, there is a set of damping discs or pads 25 associated with each rotational joint.

The damping disks or pads 25 may be made from the same friction or visco-elastic material as described for the embodiment above.

As shown in FIG. 7 the damping pad or disk may be a of disc shape and with an opening, hole or aperture 26, to correspond to the respective holes 23, 24 in the first elongate plate 17 and in the second elongate plate 18, respectively.

Similar to the embodiments described above with reference to FIGS. 1 to 5, the dimensions of the individual damping pads or discs 25 in a set of friction pads or discs 25 that is associated with a particular joint can be selected in order to obtain particular characteristics for the damper. Thus, there can be first damping discs with e.g. a larger inner diameter in a set of damping discs whilst the other second damping discs of the set damping discs have a smaller inner diameter. Therefore, the first damping discs have a smaller effective surface area compared to the second damping discs. The damping effect between elongate plates 17, 18 with the first damping discs therebetween will be less than the damping effect between elongate plates 17, 18 with the second damping discs therebetween. Consequently, by having a set of damping discs or pads that includes individual damping discs or pads with different dimensions the characteristics of the damper can be adapted to the needs.

In the damper 1, shown in FIGS. 6 and 7, there are eight first elongate plates 17 (four in each set), ten second elongate plates 18 (five in each set), and 16 damping disks or pads 25.

There are washers 20 located on the surface of the second elongate plates 18 that are located in the uppermost layer and on the surface of the second elongate plates 20 that are located in the lowermost layer, respectively. There are clamping means in the form of disc springs 21 arranged on the outer surface of each of these washers 20. The clamping means/disc springs 21 functions as an energy buffer for the compression or clamping force, pressing the first elongate plates 17 and the second elongate plates 18 together and towards the damping members 25. There may be provided holes or apertures in the disc springs 21 that also correspond to the holes 23, 24, and 26 to provide the abovementioned rotational connection. There may be washers 22 arranged on the opposite side of the disc springs 21 with respect to the washers 20. The bolts 19 are passed through the washers 22, the holes in the disk springs 21, the holes 23,24 and 26, and the nuts 19a are affixed to the tips of the bolts 19 where they protrude from the holes. The nut 19a is to prevent loosening, so a double nut is used.

The compression or clamping force that first elongate plate 17 and the second elongate plate 18 press on the friction member 25 can be adjusted using the amount of tightening on the nuts 42, the spring constant of the disc springs 21, or the number of layers of disc springs 21.

The shape and dimension of the holes or apertures 24 in the individual second plates 18 in a set can be chosen relative to the shape and dimension of the bolt 19 to provide a larger or smaller amount of clearance between the bolt 19 and the hole or aperture 24. This is illustrated in FIG. 8 and FIG. 9.

Figure 8:
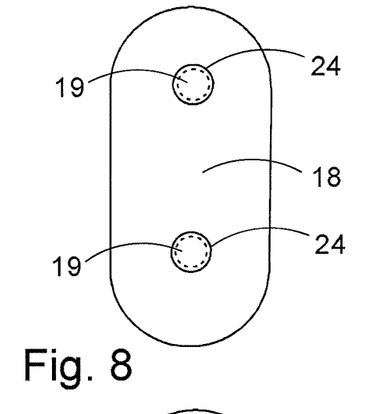

FIG. 8 shows a "regular" second elongate plate 18. The elongate plate 18 is provided with a circular hole or aperture 24 near each of its two opposite ends. The diameter of the circular hole or aperture 24 is chosen relative to the diameter of the bolt 19 such that there is a small or minimal amount of clearance between the hole or aperture 24 and the bolt 19 for allowing rotational movement of the bolt 19 relative to the second elongate plate 18, though without providing a substantial clearance or backlash between the bolt 19 and the second elongate plate 18. Thus, when the bolt 19 moves, e.g. due to e.g. a movement of the set of first elongate plates 17 this type of second elongate plate 18 will move substantially in unison with the bolt, also for relatively small movements of the bolt 19.

Figure 9:
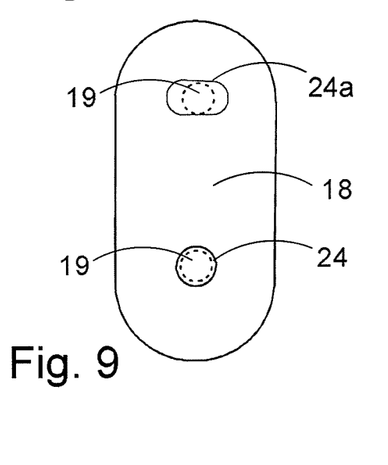

FIG. 9 shows a "special" second elongate plate 18. The special elongate plate 18 is provided with an elongate hole or aperture 24a near one of its two opposite ends and with a conventional circular hole or aperture 24 near its opposite end. The diameter of the circular hole or aperture 24 is chosen relative to the diameter of the bolt 19 is as described for the regular second elongate plate.

The dimension of the elongate hole or aperture 24a is chosen relative to the diameter of the bolt 19 such that there is a substantial amount of clearance between the hole or aperture 24 and the bolt 19 for allowing translational movement in at least on direction of the bolt 19 relative to the second elongate plate 18. Thus, when the bolt 19 moves in the direction of the longitudinal extent of the elongate hole or aperture 24a, e.g. due to e.g. a movement of the set of first elongate plates 17 this type of second elongate plate 18 will not move in unison with the bolt, when the movement of the bolt 19 is smaller than the longitudinal extent of the elongate hole or aperture 24a. The bolt 19 will urge or force the second elongate plate 18 to move only when the extent of the movement of the bolt 19 in the direction of the longitudinal extent of the elongate hole or aperture 24a is larger than the longitudinal extent of the elongate hole or aperture 24a. Thus, by choosing the shape and dimensions of the hole or aperture 24 in the second elongate plate 18 it can be decided at which extent of size of movement or at which of amplitude of an oscillation at particular second elongate plate 18 will start moving and starts to provide a damping effect. This renders it possible to design a damper 1 with one or more sets of second elongate plates 18 that includes one or more elongate plates 18 with the special apertures 24 that provide for a substantial amount of clearance between the bolt 19 and the second elongate plate 18 concerned. This allows for the construction of a damper 1 for which certain second elongate plate 18 come into action immediately, i.e. at small movements only the regular plates 18 come in action whilst the other "special" elongate plates of the set concerned will only come into action at the larger movements of the bolt 19, i.e. when the movements are caused by vibrations with a greater amplitude. The provision to include different types of second elongate plates 18 opens the possibility to design the damping characteristic (impedance) according to the particular needs of the construction in which the damper 1 is to be used.

The operation of the dampers 1 according to the present exemplary embodiment is known in detail from the prior art document cited in the introductory portion of the present description. Shortly explained, when a force substantially in the direction of the longitudinal extent of the first elongate plates 17 is applied to the joints 23 of the respective elongate plate 17 in opposite directions in the damper 1 either extends or retracts which causes a relative rotational movement between the first elongate plate 17 and the second elongate plate 18 about the joints defined by the bolts 19 and the relative rotational movement causes energy to be dissipated between the respective elongate plate 17, 18 and the damper pads or discs 25 therebetween. The energy dissipation causes the damping effect. Depending on the amplitude or size of the movement only a few of the elongate plates 18 or all of the elongate plates 18 move and participate in the damping effect.

Figures 10A, 10B, 10C, 10D, 10E, 10F:
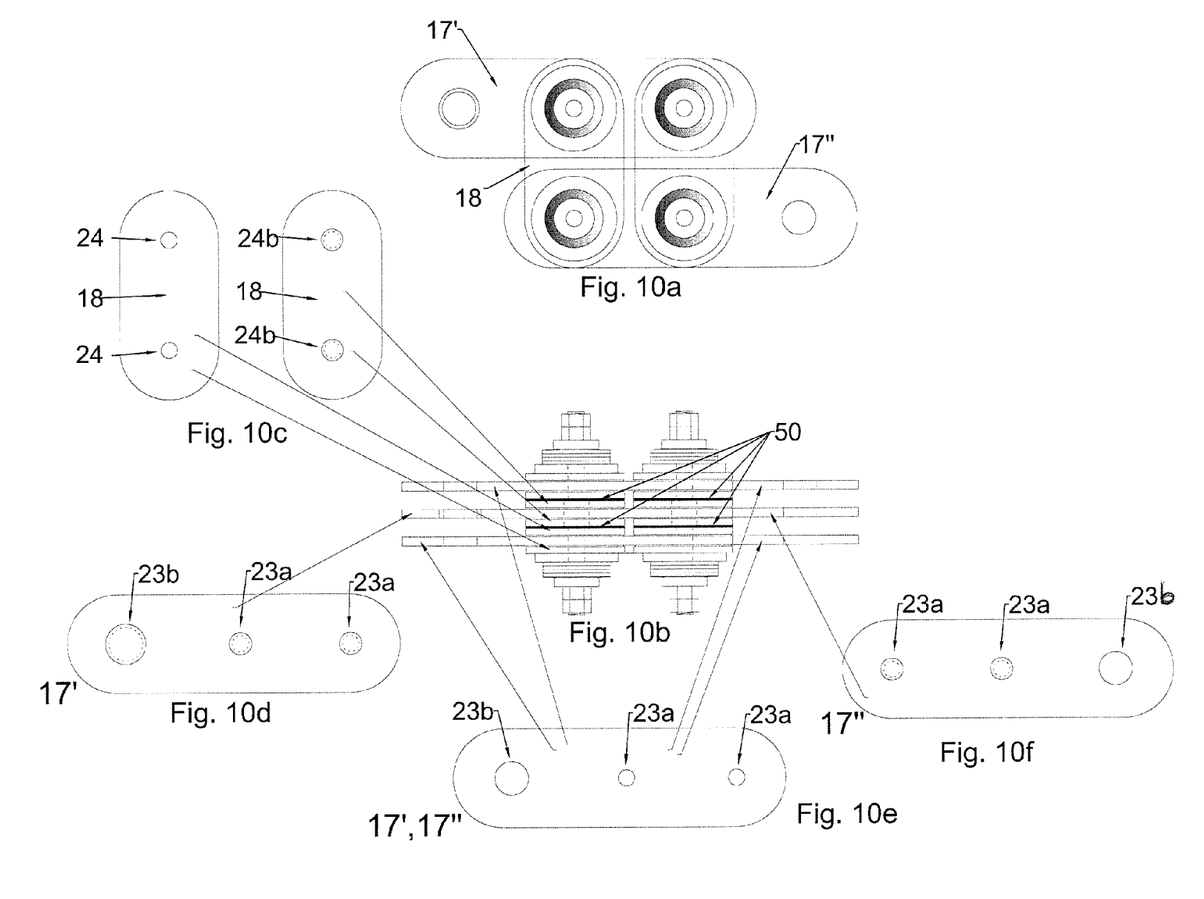

FIGS. 10a-10f shows a damper 1 similar to the one shown in FIGS. 6-9. The same reference numbers are used for like parts. The damper 1 in this embodiment have 6 first plates 17 and 12 second plates 18, but embodiments with more plates may be made. For the clarity of this description, the first plates 17 shown in the top of FIG. 10a are called upper plates and designated by the reference number 17'. Similarly the first plates 17 shown in the bottom of FIG. 10a are called lowe plates and designated by the reference number 17". In the real damper the orientation may be different.

In FIG. 10c two different second plates are shown. The plate on the left of the figure has holes 24 adapted with a clearance to match the dimensions of the bolt 19. The plate to the right in the figure has holes 24b with a larger dimension. The dimension of the holes in the plate to the right in the figure can be compared to the dimension of the holes 24 in the plate on the left of the figure by the size of the smaller holes being indicated by a dashed line. With arrows the location of the two types of plates in the damper is shown in the top view of the drawing, FIG. 10b.

In FIG. 10d an upper plate 17' of the first plates 17 is shown. The hole 23b on the left side of this figure is adapted for rotational connection to braces (not shown) to connect the damper to a structural part of a building. The plate 17' also has two holes 23a adapted for connecting to the other the other parts (other first and second plates, friction pads, etc) of the damper 1 via bolt 19. The location of this first plate 17' is indicated by an arrow to FIG. 10b. It can be seen that the plate is the central one of the three upper plates 17'.

In FIG. 10e another first plate 17 is shown. This can be used as upper plate 17' or as lower plate 17". This plate also has one hole 23b shown on the left side of the figure, which is adapted for rotational connection to braces (not shown) to connect the damper to a structural part of a building. The plate also has two holes 23a adapted for connecting to the other the other parts (other first and second plates, friction pads, etc) of the damper 1 via bolt 19. The plate in FIG. 10e differs from the plate in FIG. 10d in that the holes 23a in FIG. 10e are dimensioned to adapted with just a minute clearance to match the dimensions of the bolt 19, whereas the holes 23a in FIG. 10d are larger than in FIG. 10e. This is indicated in FIG. 10d by the dashed lines. The dashed lines show the size of the corresponding holes in FIG. 10e. The size of these holes 23a in FIG. 10e is the same as the holes 24 in the second plate on the left of FIG. 10c.

The plates in FIGS. 10d and 10e also differs in that the hole 23b for connection to braces is bigger in the FIG. 10d plate than in the FIG. 10e plate. Again, the difference in size is indicated by the dashed line in FIG. 10d. Arrows to FIG. 10b shows the location of the 4 plates of the FIG. 10e type.

A third type of first plates 17 is shown in FIG. 10f. This is for use as a lower plate 17". This plate has a hole 23b for connection to braces of the same size as the plate shown in FIG. 10e, and holes 23a that are larger than the similar holes in FIG. 10e, as indicated by the dashed lines. An arrow to FIG. 10b shows the location of the one plate of the FIG. 10f type.

Thus the damper shown in FIGS. 10a and 10b has 3 upper first plates 17', the central one of which is of the FIG. 10c type, and the two other of the FIG. 10e type. Further, the damper shown in FIGS. 10a and 10b has 3 lower first plates 17", the central one of which is of the FIG. 10f type, and the two other of the FIG. 10e type. Thereby, the damper may be adapted for dissipating movements of different magnitudes in a building in which is installed, in a manner similar to the embodiments described above.

The embodiment of the damper as described in FIGS. 10a-10f may further be provided with a set of pads 50 configured for reducing friction. Such pads 50 may be formed in e.g. Teflon or another similar material. They may also be constructed with a ball type bearing. The pads 50 are arranged in the layers of first and second plates 17, 18 to allow a further play of those plates having enlarged holes 23a, 23b, 24, see above.

In FIG. 10b the damper 1 may thus be constructed by the following layering of plates 17, 18, seen from top to bottom in the figure (for each of the bolts 19): After the bolts, the disk spring and the washer, there is arranged a second plate of the type in the left side in FIG. 10C. Then a first plate 17 of the FIG. 10e type. Then a second plate 18 of the type in the left side in FIG. 10C. Then a friction reducing pad 50. Then a second plate 18 of the type in the right side in FIG. 10C, i.e. with enlarged holes 24. Then an upper first plate 17' of the FIG. 10*d* type, i.e. with enlarged holes 23*a*, 23*b*. (In the lower layer 17" there could be a first lower plate 17" of the FIG. 10*f* type, this is not shown). Then another second plate 18 of the type in the right side in FIG. 10C, i.e. with enlarged holes 24. Then a friction reducing pad 50. Then a second plate 18 of the type in the left side in FIG. 10C. Then a first plate 17 of the FIG. 10*e* type. Then a second plate of the type in the left side in FIG. 10C. Thereby, the plates having increased diameter holes are centrally located, and surrounded by friction reducing pads 50, and thereby allowed another tolerance of slip than the plates surrounding them. Friction pads are arranged between each of the first and second plates 17, 18, as is explained for the embodiments described for FIGS. 6 through 9 above.

The teaching of this disclosure has numerous advantages. Different embodiments or implementations may yield one or more of the following advantages. It should be noted that this is not an exhaustive list and there may be other advantages which are not described herein. One advantage of the teaching of this disclosure is that it provides for a passive damper with a characteristic or impedance that changes with the magnitude of the movement that it is exposed to. It is another advantage that it provides for a damper that can be easily adapted to a specific need.

The term "clearance" as used in this description refers the clearance between mating components and defines the amount of motion that is possible between the mating components. The term "clearance is similar to backlash or play, but in the context of this description the terms have do not have a negative meaning as the described clearance is desirable.

Although the teaching of this application has been described in detail for purpose of illustration, it is understood that such detail is solely for that purpose, and variations can be made therein by those skilled in the art without departing from the scope of the teaching of this application.

The term "comprising" as used in the claims does not exclude other elements or steps. The term "a" or "an" as used in the claims does not exclude a plurality. The single processor or other unit may fulfill the functions of several means recited in the claims.

The invention claimed is:

1. A passive damper for dampening relative movement between members of a structure to which said damper can be connected, said damper comprising:
    at least a first set of parallel disposed plates coupled to a first member of the structure,
    and a second set of parallel disposed plates coupled to a second member of the structure, the second set of parallel disposed plates comprising at least one first plate and at least one second plate;
    wherein said first set of parallel disposed plates and said second set of parallel disposed plates overlap one another in an alternating fashion at a rotational joint with damping pads between said first set of parallel disposed plates and said second set of parallel disposed plates,
    wherein said rotational joint comprises a pin or bolt inserted through apertures in said first set of parallel disposed plates and said second set of parallel disposed plates;
    a connection hole in each of the at least one first plate and the at least one second plate of the second set of parallel disposed plates for receiving a connection pin therein, the connection pin connecting the second set of parallel disposed plates including the first and second plates together and connecting the second set of parallel disposed plates to the second member of the structure;
    wherein a shape and size of the connection hole in the at least one first plate is dimensioned relative to the shape and size of the cross-section of said connection pin such that there is substantially no clearance between the connection hole in the at least one first plate and the connection pin; and
    wherein the connection hole in the at least one second plate is shaped and dimensioned to provide a predetermined amount of clearance with said connection pin so that said connection pin can move inside the connection hole in the at least one second plate to a predetermined extent when the at least one first plate moves without the at least one second plate taking part in the damping action of the damper.

2. A damper according to claim 1, wherein an aperture in one of the at least one second plate provides a first amount of clearance with said connection pin; and
    an aperture in another one of the at least one second plate provides a second amount of clearance with said connection pin.

3. A damper according to claim 1, wherein the at least one first plate moves with said second member at any amplitude of movement of said second member and wherein said at least one second plate moves with said second member only if the extent of the movement of said second member exceeds the predetermined clearance between the connection hole and the connection pin.

4. A damper according to claim 1, wherein the connection hole in the at least one second plate has an elongated outline or shape.

5. A damper according to claim 2, the second amount of clearance provided by the aperture in the another one of the at least one second plate is larger than said first amount of clearance.

6. A damper according to claim 1, wherein said plurality of damper pads comprises a first selection of pads with a first effective contact area size and a second selection of pads with a second effective contact area size different from said first effective contact area size.

7. A damper according to claim 6, wherein said damper pads are disk shaped with a central hole and an effective contact area is differentiated in a selection of damping pads through the section of the outer diameter and/or the inner diameter of the damping pads concerned.

8. A passive damper for dampening relative movement between members of a structure to which said damper can be connected, said damper comprising:
    a first set of parallel disposed plates, and
    a second set of parallel disposed plates,
    wherein said first set of parallel disposed plates and said second set of parallel disposed plates overlap one another in an alternating fashion at a rotational joint with damping pads between said first set of parallel disposed plates and said second set of parallel disposed plates,
    said rotational joint comprises a pin or bolt inserted through apertures in said first set of parallel disposed plates and said second set of parallel disposed plates, the inserted pin or bolt connecting the first set of plates to the second set of plates;
    wherein said second set of parallel disposed plates comprises at least one first plate and at least one second plate;
    wherein a shape and size of the apertures in the at least one first plate are dimensioned relative to a shape and size of a cross-section of said pin or bolt such that the at least one first plate has substantially no clearance between the aperture and the pin or bolt; and wherein a shape and size of the apertures in said at least one second plate are shaped and dimensioned to provide a predetermined amount of clearance with respect to said pin or bolt disposed in said aperture so that said pin or bolt can move inside said aperture to a predetermined extent without said at least one second plate taking part in the damping action when the at least one first plate is taking part in the damping action.

9. A passive damper for dampening relative movement between members of a structure, said damper comprising:

a first set of parallel disposed plates coupled to a first member of the structure;

a second set of parallel disposed plates coupled to a second member of the structure, the second set of parallel disposed plates comprising at least one first plate and at least one second plate;

a rotational joint joining the first set of parallel disposed plates and the second set of parallel disposed plates, wherein the rotational joint comprises a pin or bolt inserted through apertures in said first set of parallel disposed plates and apertures in said second set of parallel disposed plates, wherein the first set of parallel disposed plates and the second set of parallel overlap one another in an alternating fashion at the rotational joint;

a connection hole in each of the at least one first plate and the at least one second plate of the second set of parallel disposed plates for receiving a connection pin therein, the connection pin connecting the second set of parallel disposed plates together and connecting the second set of parallel disposed plates to the second member of the structure;

wherein a shape and size of the connection hole in the at least one first plate is dimensioned relative to the shape and size of the cross-section of said connection pin such that there is substantially no clearance between the connection hole in the at least one first plate and the connection pin;

wherein the connection hole in the at least one second plate is shaped and dimensioned to provide a predetermined amount of clearance with respect to said connection pin so that said connection pin can move inside the connection hole in the at least one second plate to a predetermined extent when the at least one first plate moves without the at least one second plate taking part in the damping action of the damper; and wherein a connection hole in a first one of the at least one second plate provides a first amount of clearance with respect to the connection pin, and a connection hole in a second one of the at least one second plate provides a second amount of clearance with respect to the connection pin.

10. The passive damper of claim 9, wherein a connection hole in a third one of the at least one second plate provides a third amount of clearance with respect to the connection pin that is different from the first amount and the second amount.

11. The passive damper of claim 9, wherein the connection hole comprises an elongate aperture.

12. The passive damper of claim 9, comprising damping pads between plates of the first set of parallel disposed plates and plates of the second set of parallel disposed plates.

13. A passive damper for dampening relative movement between members of a structure to which said damper can be connected, said damper comprising:

a first set of parallel disposed plates, and a second set of parallel disposed plates, wherein said first set of parallel disposed plates and said second set of parallel disposed plates overlap one another in an alternating fashion at a rotational joint with damping pads between each plate in said first set of parallel disposed plates and said second set of parallel disposed plates, said rotational joint comprises a pin or bolt inserted through apertures in said first set of parallel disposed plates and said second set of parallel disposed plates, the inserted pin or bolt connecting the first set of plates to the second set of plates;

wherein said second set of parallel disposed plates comprises at least one first plate and at least one second plate;

wherein a shape and size of the apertures in the at least one first plate are dimensioned relative to a shape and size of a cross-section of said pin or bolt such that the at least one first plate has substantially no clearance between the aperture and the pin or bolt;

wherein a shape and size of the apertures in said at least one second plate are shaped and dimensioned to provide a predetermined amount of clearance with respect to said pin or bolt disposed in said aperture so that said pin or bolt can move inside said aperture to a predetermined extent without said at least one second plate taking part in the damping action when the at least one first plate is taking part in the damping action; and wherein an aperture in a first one of the at least one second plate provides a first amount of clearance with respect to the pin or bolt, and an aperture in a second one of the at least one second plate provides a second amount of clearance with respect to the pin or bolt.

14. The passive damper of claim 13, wherein an aperture in a third one of the at least one second plate provides a third amount of clearance with respect to the pin or bolt that is different from the first amount and the second amount.

* * * * *